United States Patent

Bothra et al.

[11] Patent Number: 5,889,389
[45] Date of Patent: Mar. 30, 1999

[54] MICRO-ELECTROMECHANICAL VOLTAGE SHIFTER

[75] Inventors: Subhas Bothra, San Jose; Jayarama N. Shenoy, Santa Clara, both of Calif.

[73] Assignee: VLSI Technology, Inc., San Jose, Calif.

[21] Appl. No.: 14,832

[22] Filed: Jan. 28, 1998

[51] Int. Cl.⁶ .................................................. H01M 10/46
[52] U.S. Cl. ............................................................ 320/166
[58] Field of Search ...................... 320/166, 167; 333/205, 202; 73/514.01, 514.35, 514.36

[56] References Cited

U.S. PATENT DOCUMENTS

| | | | |
|---|---|---|---|
| 5,610,335 | 3/1997 | Shaw et al. | 73/514.36 |
| 5,808,527 | 9/1998 | De Los Santos | 333/205 |

*Primary Examiner*—Edward H. Tso
*Attorney, Agent, or Firm*—Wagner, Murabito & Hao

[57] ABSTRACT

The present invention is a micro-electromechanical voltage shifter. According to one embodiment, the voltage shifter of the present invention comprises a capacitor and micro-electromechanical means for changing a capacitance of the capacitor. The capacitor is initially charged and then electrically isolated. When the capacitance is altered, potential difference across the capacitor is shifted accordingly. In one embodiment of the present invention, the micro-electromechanical means includes a gear wheel driven by a micro-motor. The gear wheel preferably includes a plurality of teeth protruding along a circumference of the gear wheel. Further, the gear wheel is positioned next to the capacitor and configured to move the teeth into and out of a gap between the capacitor plates. As the teeth is preferably made of dielectric material, the voltage across the capacitor is changed as a tooth enters or leaves the gap. In another embodiment, the teeth may be made of a conducting material. The thickness of the teeth may also vary to provide a wide range of voltage levels.

23 Claims, 8 Drawing Sheets

5,889,389

MICRO-ELECTROMECHANICAL VOLTAGE SHIFTER

FIELD OF THE INVENTION

The present invention pertains generally to the field of micro-electromechanical systems (MEMS).

BACKGROUND OF THE INVENTION

In the past decades, a tremendous amount of research and development has been expended in the field of semiconductor circuits. Microelectronics chips made out of silicon can now be found in everything from microwave ovens to communications satellites. Advances in semiconductor technology, especially in the field of semiconductor processing, beget an emerging technology known as micromachining or micro-electromechanics.

Micro-electromechanical systems (MEMS) are fabricated with many of the same fabrication techniques that have miniaturized electronic circuits and have made mass-production of silicon integrated-circuit chips possible. Using fabrication techniques such as wet etching and photolithography, basic structures like grooves, holes, trenches, hemispheres, cantilevers, gears, and shafts, etc., can be built on a silicon wafer. From these basic structures, a wide variety of mechanical devices can be constructed. Among the many MEMS that have been successfully implemented are valves, springs, nozzles, printer heads, accelerometers, and chemical sensors. Even a device as complex as a gas chromatograph, an instrument for identifying and quantifying the composition of gases in an unknown mixture, can now be built on a silicon wafer a few centimeters in diameter.

In such MEMS, various different electrical and mechanical devices are integrated. For instance, a power supply, a micro-motor and a chemical sensor may be constructed on a single chip. These various different electrical and mechanical devices, however, may require different voltage levels to operate. Conventionally, these different voltage levels are provided by potential dividers or transformers. However, the conventional methods for providing different voltage levels are not ideal for MEMS. For instance, potential dividers are highly dissipative and may generate excess heat undesirable in certain applications; and transformers may take up a disproportionate amount of valuable die area. More importantly, conventional voltage converters may not be fast enough for certain micro-electromechanical applications which require an ultra-fast response time.

Thus, there exists a need for a voltage shifter that is particularly compatible with micro-electromechanical systems. What is further needed is a micro-electromechanical voltage shifter that employs micro-mechanical elements to achieve voltage shifting by a combination of electrical and mechanical principles.

SUMMARY OF THE INVENTION

The present invention is a micro-electromechanical voltage shifter. According to one embodiment of the present invention, the voltage shifter comprises a capacitor, and micro-electromechanical means for altering capacitance of the capacitor. The capacitor has an initial capacitance $C_1$ and is charged with an initial voltage $V_1$. When the initial capacitance is altered to a final capacitance $C_2$, objectives of the present invention are achieved when the voltage across the capacitor shifts from the initial voltage $V_1$ to a final voltage $V_2$ as a result of the change in capacitance.

In one embodiment of the present invention, the capacitor includes a pair of parallel plates, and the micro-electromechanical means comprises a gear wheel driven by a micro-motor. In the present embodiment, the gear wheel may include a plurality of teeth protruding along a circumference of the gear wheel. Preferably, the gear wheel and the teeth are made of materials with high dielectric constants such as silicon dioxide or polysilicon. Significantly, the gear wheel is positioned to a side of the capacitor such that, when the gear wheel rotates, the teeth may traverse across a gap between the capacitor plates. As the teeth are made of dielectric material, capacitance of the capacitor is altered according to a position of the teeth. The change in capacitance causes a corresponding change in the voltage across the capacitor. According to the present embodiment, the change in capacitance is dependent upon the dielectric constant of the material and a thickness of the teeth.

In an alternate embodiment of the present invention, the teeth may be made of a conducting material. According to the alternate embodiment, inserting a conductor between the capacitor plates effectively shortens a separation distance of the capacitor plates. As a result, capacitance is also changed. In the alternate embodiment, the change in capacitance is dependent upon the thickness of the teeth.

In another embodiment of the present invention, the gear wheel may comprise a plurality of teeth each having a different thickness. In this embodiment, the voltage shifter may adjust the final voltage by selecting the appropriate teeth according to their thickness.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Figure 1A:
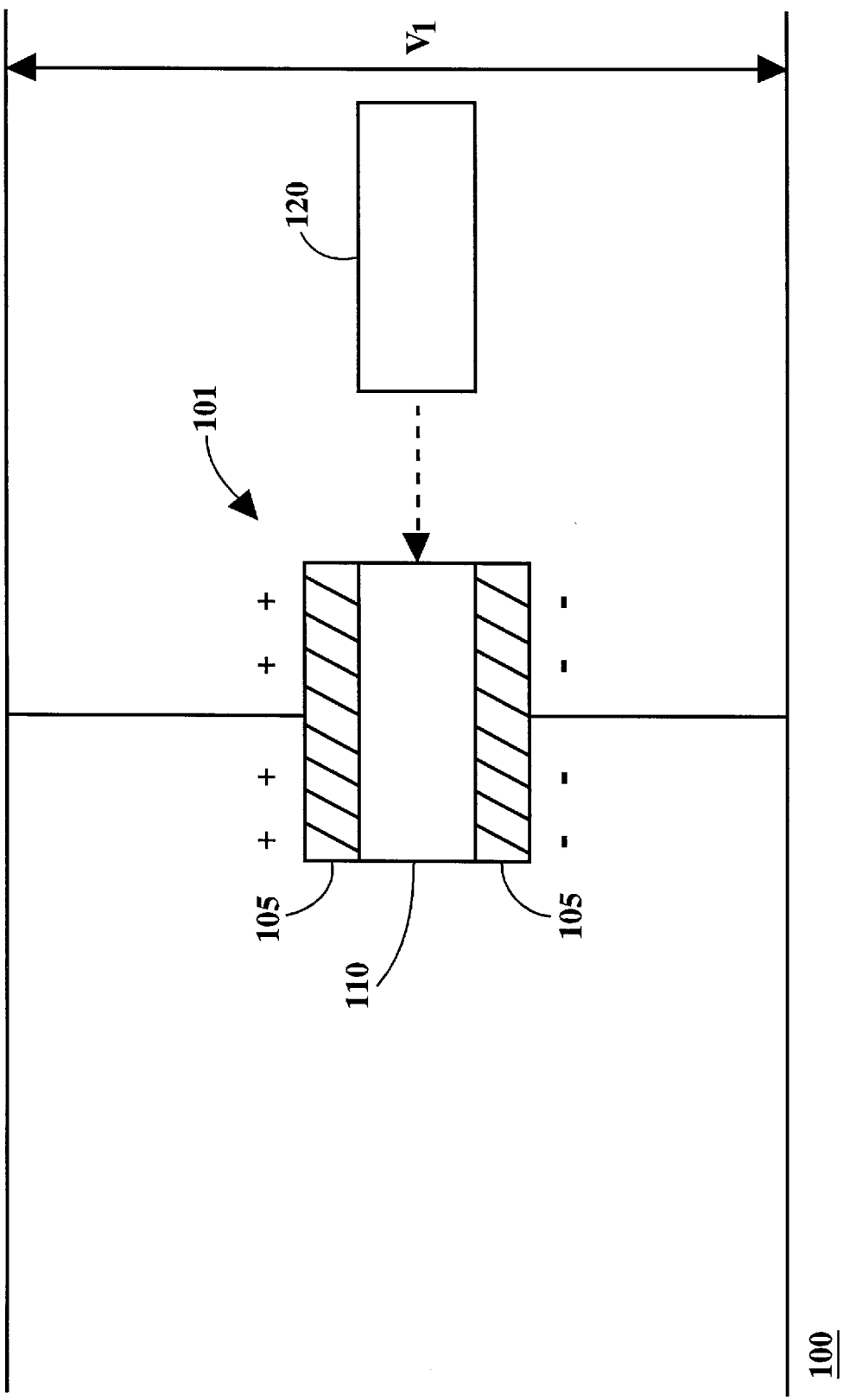
FIG. 1A is a schematic diagram of a micro-electromechanical voltage shifter according to one embodiment of the present invention. A first dielectric medium is interposed between capacitor plates of the voltage shifter.
Figure 1B:
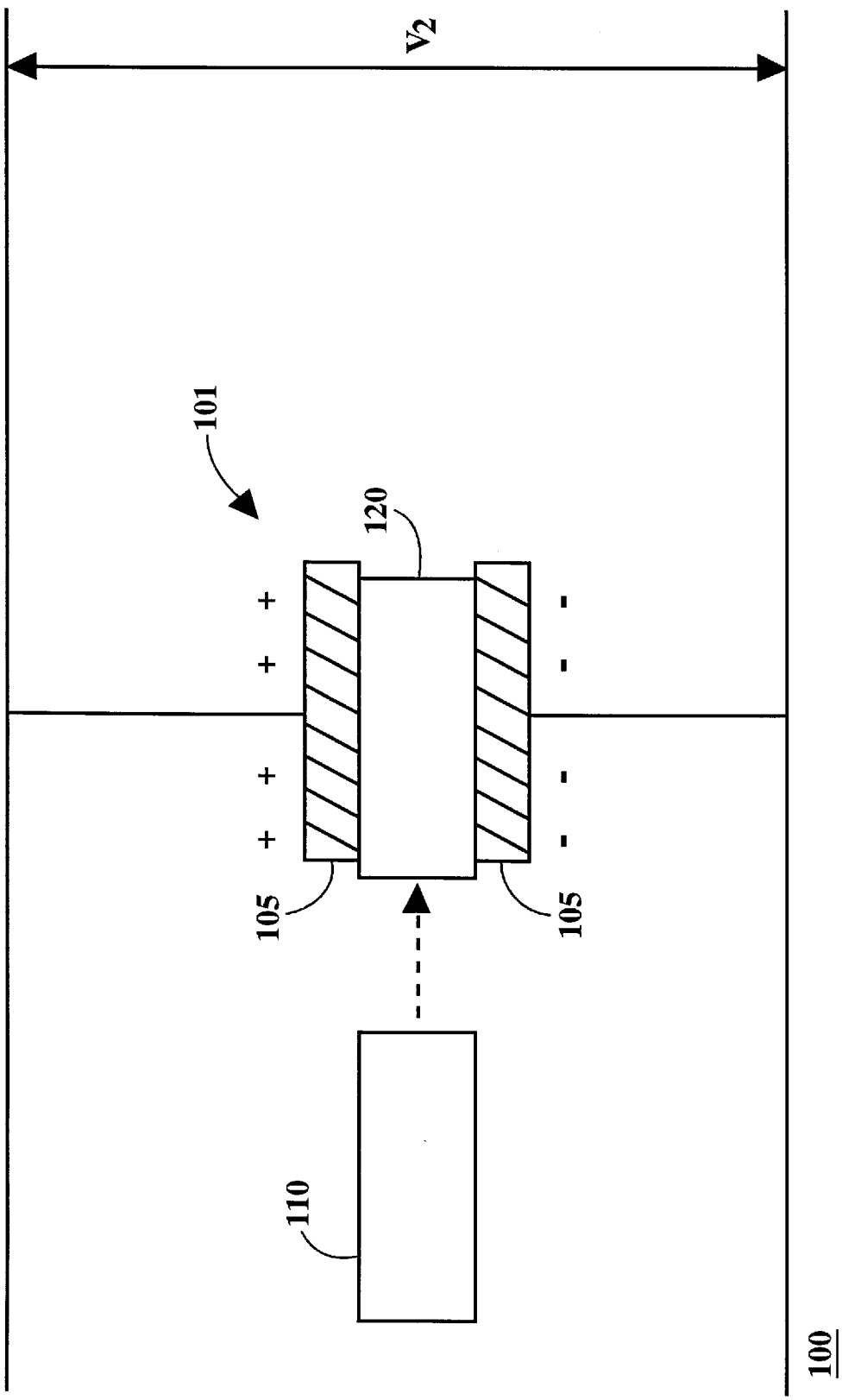
FIG. 1 B is a schematic diagram of the micro-electromechanical voltage shifter as illustrated in FIG. 1A with the first dielectric medium replaced by a second dielectric medium, resulting in a voltage shift.

FIGS. 1A and 1B illustrate a voltage shifting mechanism for micro-electromechanical systems (MEMS) in accordance with one embodiment of the present invention. In furtherance of the present embodiment, a micro-electromechanical (MEM) voltage shifter 100 comprises a parallel-plate capacitor 101 having a pair of capacitor plates 105, a first dielectric medium 110 having a dielectric constant $\epsilon_1$, and a second dielectric medium 120 having a dielectric constant $\epsilon_2$. Significantly, the capacitance of capacitor 101 is altered by selectively interposing first dielectric medium 110 and second dielectric medium 120 between capacitor plates 105. That is, first dielectric medium 110 may be selectively interchanged with second dielectric medium 120, or vice versa. Objectives of the present invention are achieved as changes in capacitance of capacitor 101 result in corresponding voltage changes across capacitor 101.

As illustrated in FIG. 1A, when first dielectric medium 110 is interposed between capacitor plates 105, an initial capacitance $C_1$ of MEM voltage shifter 100 may be generally described as:

$$C_1 = \epsilon_1 * k * A/d, \quad (1)$$

where k is the permissivity constant, and where capacitor plates 105 have an area A and are separated by a distance d. According to the present embodiment of the invention, a voltage $V_1$ is initially applied to charge capacitor 101. Capacitor 101 is then electrically isolated such that the voltage $V_1$ is maintained across capacitor 101. The total charge, Q, stored in MEM voltage shifter 100 may be calculated by:

$$Q = C_1 * V_1. \quad (2)$$

FIG. 1B illustrates MEM voltage shifter 100 of the present invention when first dielectric medium 110 is replaced with second dielectric medium 120. Since first dielectric medium 110 and second dielectric medium 120 have different dielectric constants, capacitance of capacitor 101 is altered. Particularly, the final capacitance, $C_2$, of capacitor 101 may now be described by:

$$C_2 = \epsilon_2 * k * A/d. \quad (3)$$

As capacitor 101 is electrically isolated, the change in capacitance does not alter the total charge 0. Thus, $$Q = C_1 * V_1 = C_2 * V_2, \quad (4)$$

and, therefore, $$V_2 = (C_1/C_2) * V_1. \quad (5)$$

Substituting equations (1) and (3) into (5), the following result is obtained:

$$V_2 = (\epsilon_1/\epsilon_2) * V_1. \quad (6)$$

Thus, voltage across capacitor 101 is effectively shifted when a first dielectric medium between capacitor plates 105 is replaced by a second dielectric medium. Notably, the voltage gain ($V_2/V_1$) is proportional to a ratio of the dielectric constants of the dielectric media initially and subsequently interposed between capacitor plates 105.

Figure 2A:
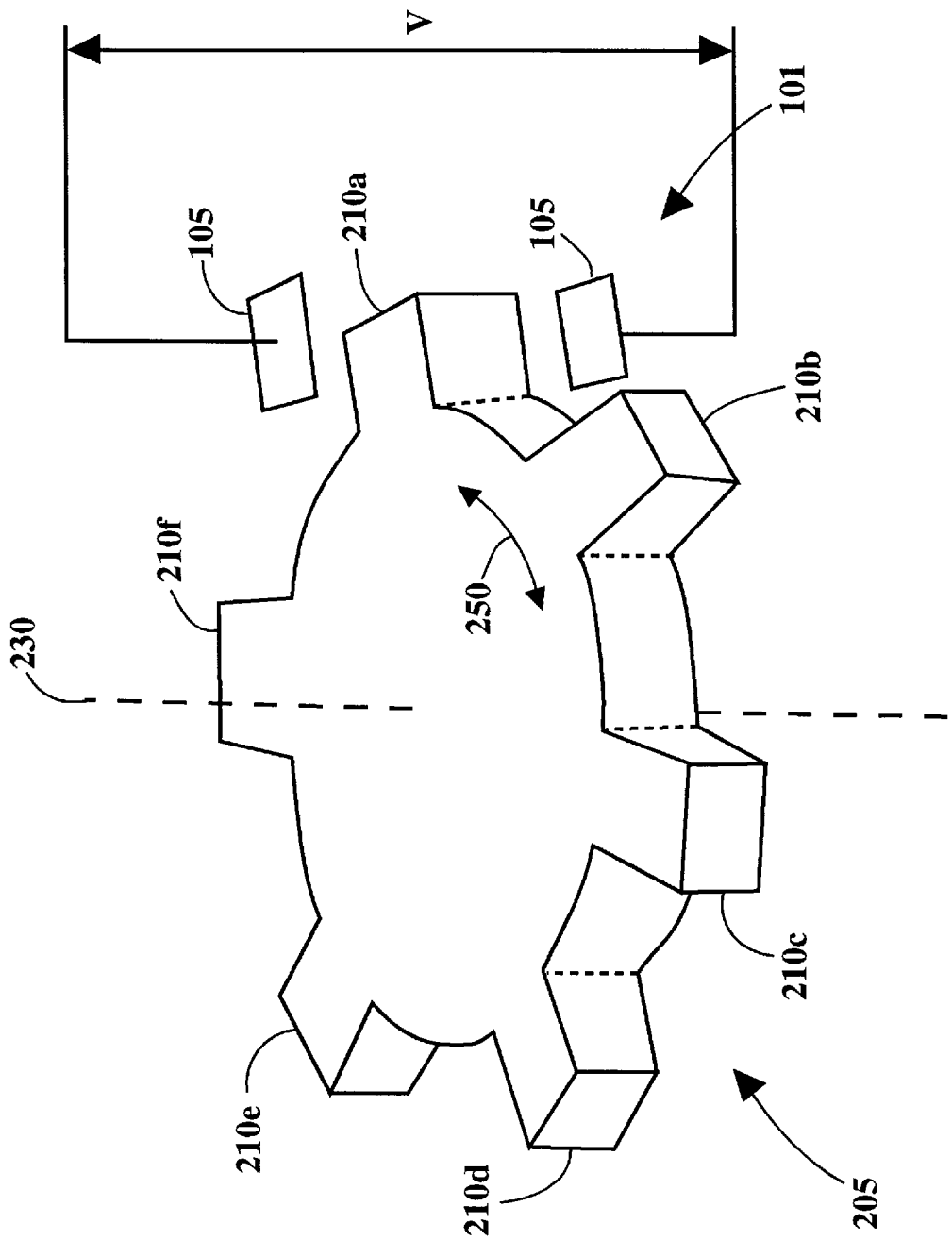
FIG. 2A is a schematic diagram of a micro-electromechanical voltage shifter according to one embodiment of the present invention. The voltage shifter comprises a pair of capacitor plates and a micro-electromechanical gear wheel.
Figure 2B:
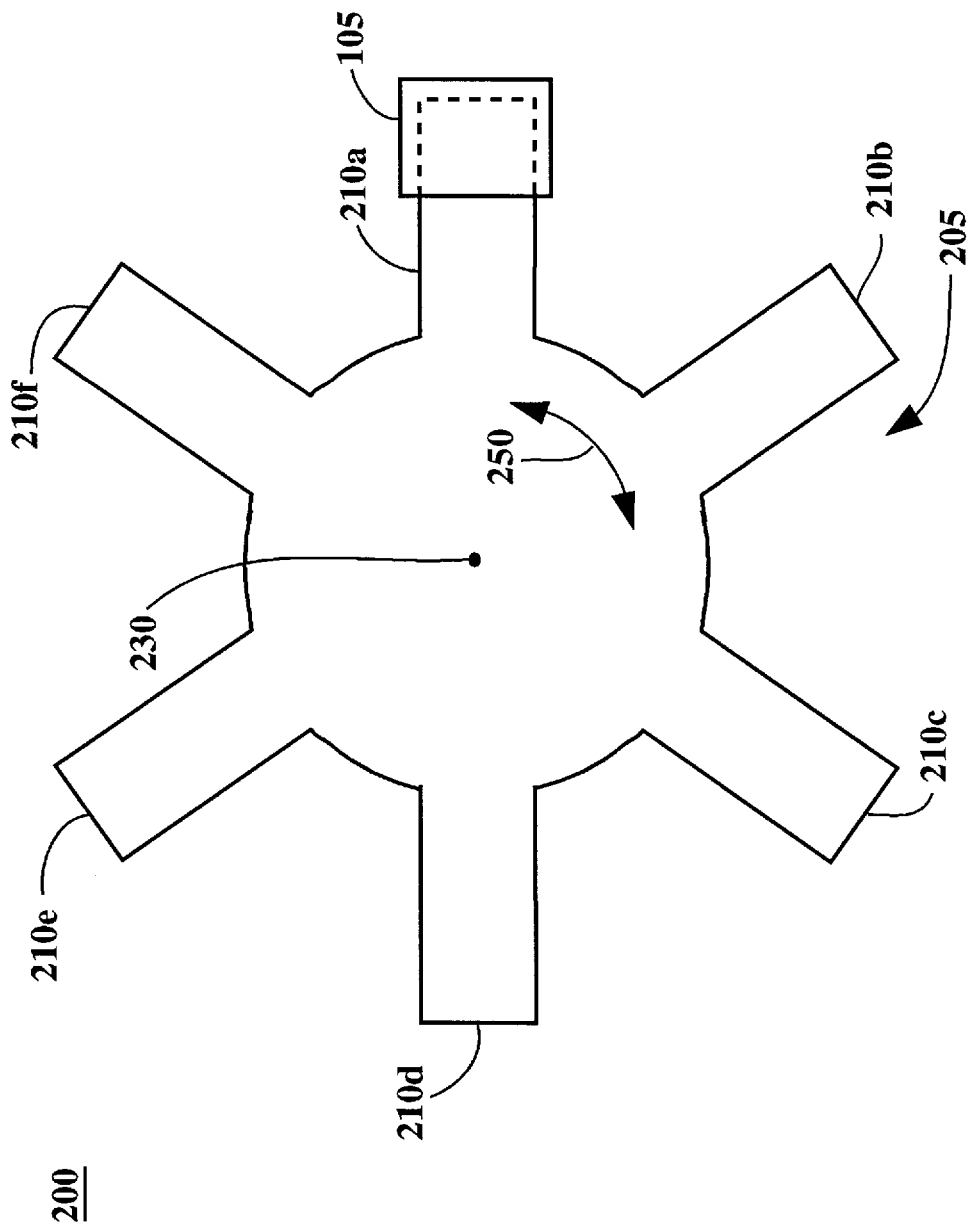
FIG. 2B is a top view of the micro-electromechanical voltage shifter as illustrated in FIG. 2A where a tooth of the gear wheel is interposed between the capacitor plates.
Figure 2C:
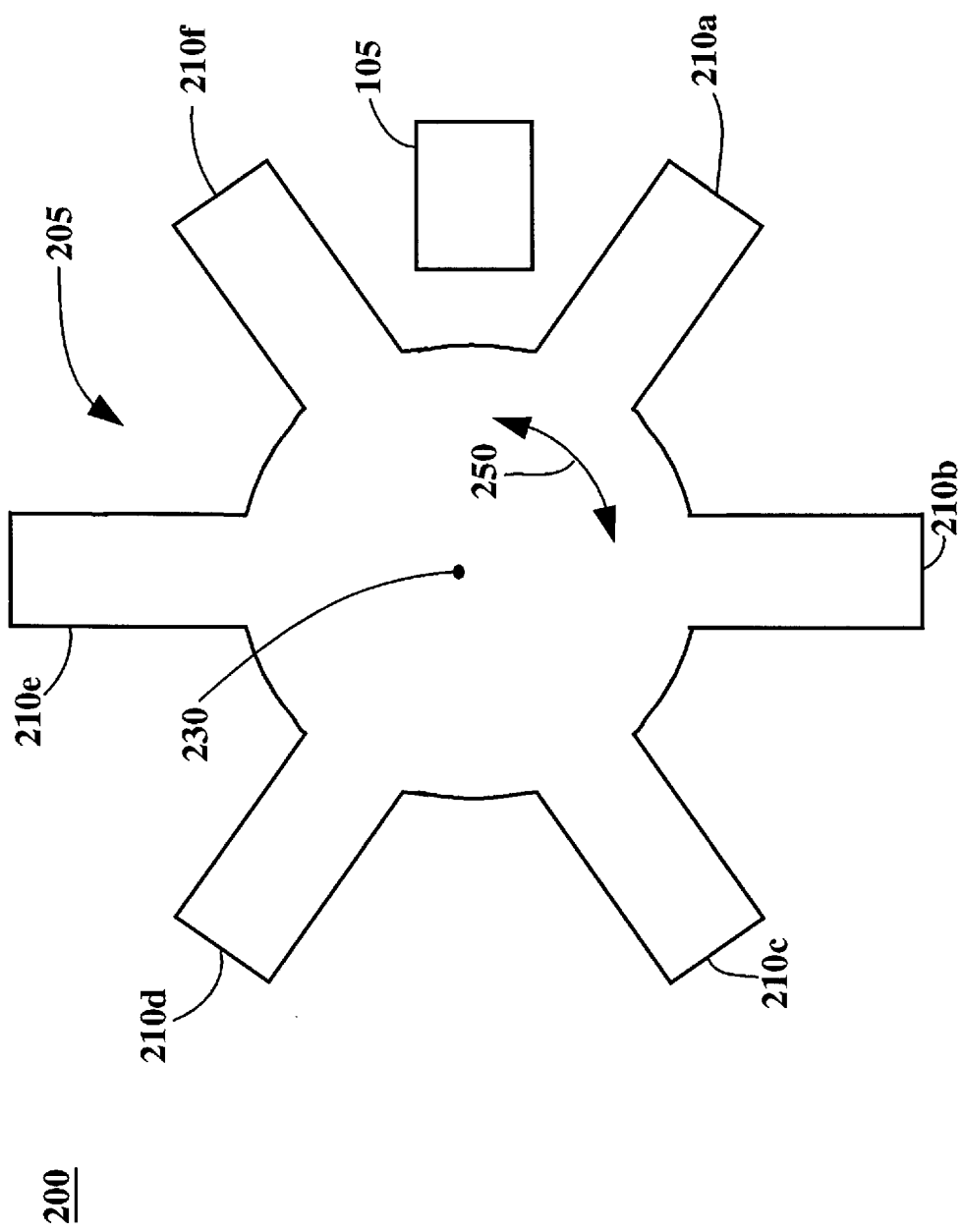
FIG. 2C is a top view of the micro-electromechanical voltage shifter as illustrated in FIG. 2A where gear wheel is rotated to remove the tooth from between the capacitor plates.

FIGS. 2A–2C are perspective and top views of one specific embodiment of an MEM voltage shifter 200 according to the present invention. Significantly, MEM voltage shifter 200 comprises a parallel-plate capacitor 101 having a pair of capacitor plates 105, and a micro-electromechanical gear wheel 205. Preferably, gear wheel 205 is driven by a micro-electromechanical motor (not shown) such as a side-drive electrostatic motor. Side-drive electrostatic motors are well known in the art of MEMS, and are therefore not discussed in detail to avoid obscuring aspects of the present invention. Further, in one embodiment of the present invention, gear wheel 205 may also be used as a rotor in such micro-electromechanical motors.

In the specific embodiment illustrated in FIGS. 2A–2C, gear wheel 205 is circular in shape and comprises a plurality of teeth 210a–f protruding radially from the center of gear wheel 205. Further, gear wheel 205 is positioned to a side of capacitor plates 105 and is configured to rotate about an axis 230 perpendicular to capacitor plates 105 such that teeth 210a–f may enter and leave a gap between capacitor plates 105 one tooth at a time. In one embodiment, gear wheel 205 may be rotated in a step-wise fashion. Alternately, gear wheel 205 may be rotated in a continuous fashion. FIGS. 2A–2C also include an arrow 250 illustrating the direction of rotation of gear wheel 205.

FIG. 2B illustrates a top view of MEM voltage shifter 200 when gear wheel 205 is rotated to an "initial" position. In the "initial" position, tooth 210a is interposed between capacitor plates 105. According to the present embodiment, teeth 210a–f are made of a dielectric material having a high dielectric constant such as polysilicon. (Polysilicon has a dielectric constant of approximately 12.) Thus, in the "initial" position, capacitor 101 has an initial capacitance of $C_1$. Further, according to the present embodiment, capacitor 101 is charged by an external voltage supply (not shown) to an initial voltage when tooth 210a is interposed between plates 105.

After capacitor 101 is charged to the initial voltage, capacitor 101 is electrically isolated such that charges are conserved. In one embodiment, capacitor 101 may be disconnected by one or more switches (not shown). The switches may be electrical (e.g. a transistor) or micro-electromechanical. The apparatus and method for implementing an electrical or micro-electromechanical switch to isolate capacitor 101 is well known in the art, and is not discussed herein to avoid obscuring aspects of the present invention.

FIG. 2C illustrates a top view of MEM voltage shifter 200 in a "final" position. In the "final" position, tooth 210a previously interposed between capacitor plates 105 is rotated out, and the dielectric medium of capacitor 101 constitutes air. Without tooth 210a, capacitance of capacitor 101 is changed from the initial value $C_1$ to a final value $C_2$. As discussed above in relation to FIGS. 1A–1B, when capacitor 101 is initially charged, a shift in capacitance will cause a corresponding shift in voltage across capacitor 101. Thus, the initial voltage across capacitor 101 is shifted to a final voltage. The final voltage may then be used to drive other electromechanical parts of the MEMS. Naturally, capacitor 101 will be discharged when used. After discharging, MEM voltage shifter 200 may then insert another one of teeth 210a–f to interpose between capacitor plates 105, and recharge capacitor 101 such that the voltage shifting process may be repeated.

As discussed above in relation to FIGS. 1A–1B, the voltage V across capacitor 101 will shift according to a ratio of dielectric constants of the dielectric media initially and subsequently interposed between capacitor plates 105. In the specific embodiment as shown in FIGS. 2A–2C, tooth 210a is made of polysilicon having a dielectric constant of approximately 12, and air has a dielectric constant of approximately 1. Thus, in the specific embodiment as illustrated in FIGS. 2A–2C, a voltage gain of approximately 12 is achieved. It should be noted that MEM voltage shifter 200 of the present invention may used to shift voltages up or down. A shift-up mechanism has been described above with respect to FIGS. 2A–2C. However, it would be apparent to a person of ordinary skill in the art, upon reading the present disclosure, that a shift-down mechanism may be implemented by charging capacitor 101 when teeth 210a–f are not interposed between capacitor plates 105, and discharging capacitor 101 when one of teeth 210a–f is interposed between capacitor plates 105.

It should also be noted that the present invention is not limited to gear wheels made of polysilicon. Any material suitable for MEMS may be used to fabricate gear wheel 205 and teeth 210a–f. Further, in the embodiment as illustrated in FIGS. 2A–2C, gear wheel 205 and teeth 210a–f are fabricated from the same material. However, the present invention is also well suited to individually fabricating using different materials.

Figure 4:
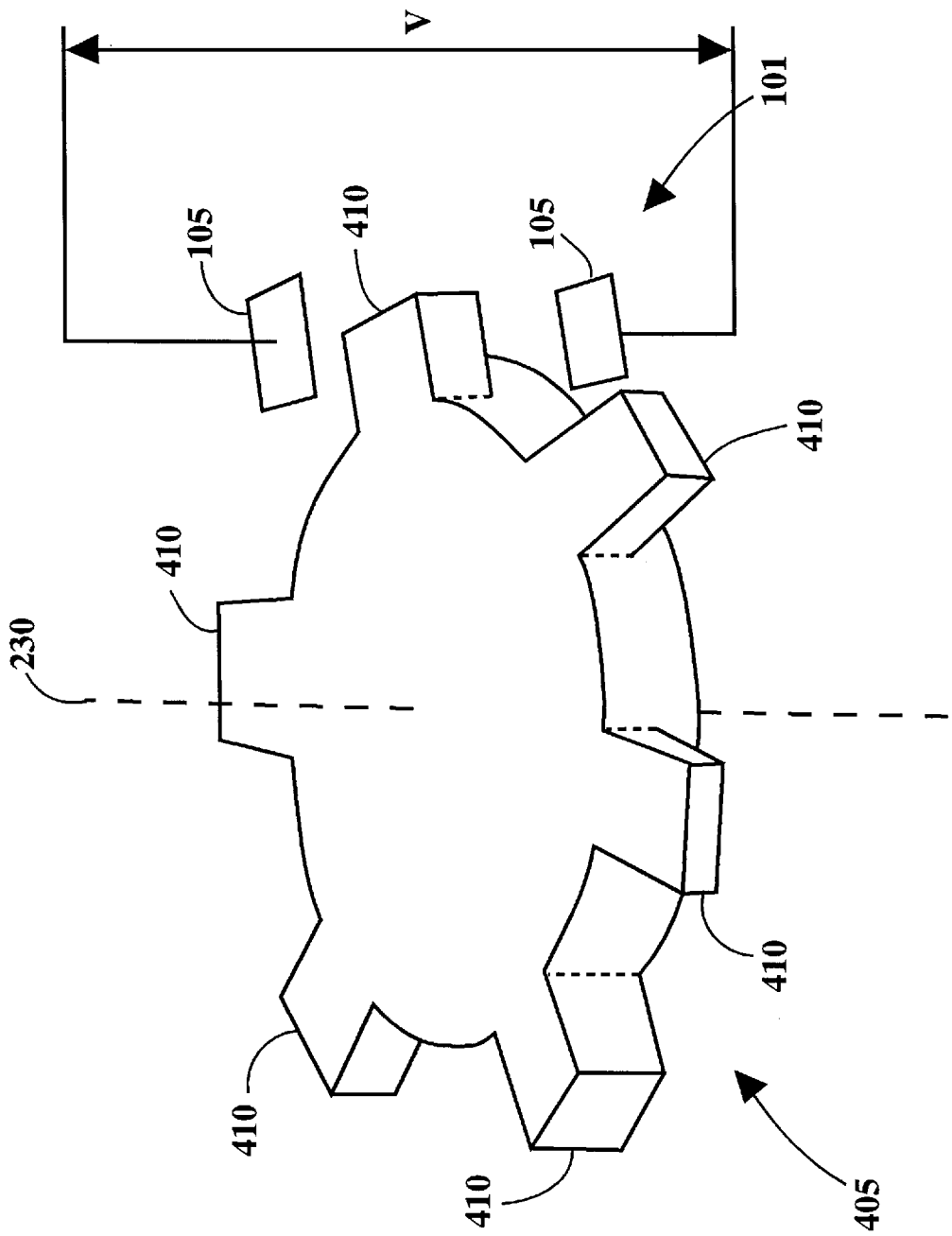
FIG. 4 is a schematic diagram of a micro-electromechanical voltage shifter according to one embodiment of the present invention. In this embodiment, the present invention comprises a gear wheel including a plurality of teeth each having a different thickness.

In addition to being dependent upon the dielectric material, the voltage across capacitor 101 is also dependent upon the thickness of teeth 210a–f. FIG. 4 illustrates one embodiment of the present invention where capacitance is altered according to a thickness of the dielectric medium. As illustrated in FIG. 4, an MEM voltage shifter 400 comprises a capacitor 101 having capacitor plates 105, and a gear wheel 405 including a plurality of teeth each having a different thickness. Gear wheel 405 may be rotated about axis 230 to selectively insert any one of teeth 410 between capacitor plates 105. Generally, the thicker the dielectric medium, the higher the resulting capacitance will be. Thus, by providing teeth 410 each having a different thickness, a wide range of voltage levels can be achieved.

Figure 3A:
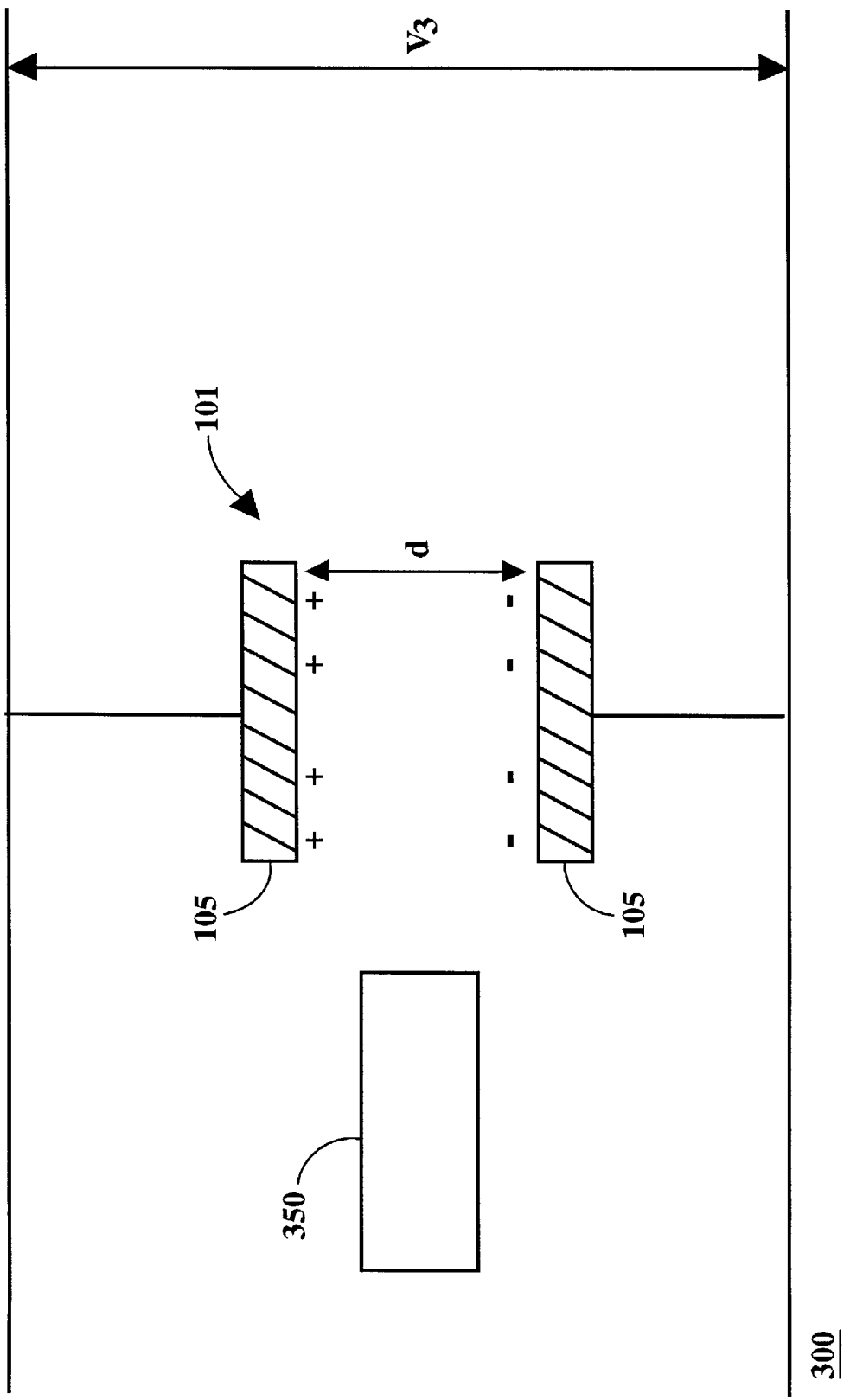
FIG. 3A is a schematic diagram of a micro-electromechanical voltage shifter according to an alternate embodiment of the present invention.
Figure 3B:
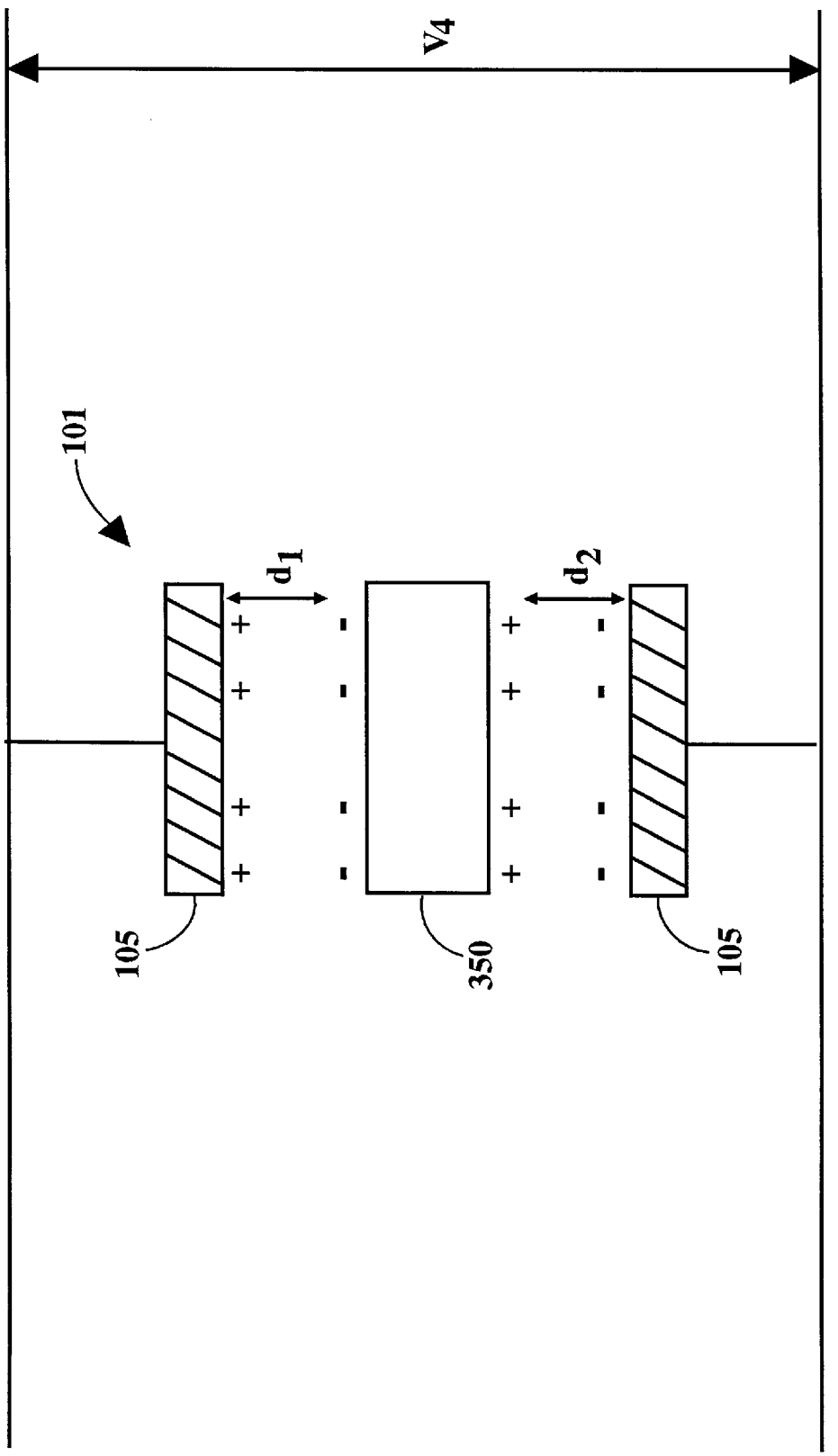
FIG. 3B is a schematic diagram of the micro-electromechanical voltage shifter as illustrated in FIG. 3A when a conducting medium is interposed between the capacitor plates, resulting in a shift in voltage.

FIGS. 3A and 3B illustrate an alternate embodiment of the present invention. As shown, an MEM voltage shifter 300 comprises a capacitor 101 having a pair of capacitor plates 105 separated by a distance d, and micro-electromechanical means for selectively interposing a conductor 350 between capacitor plates 105. A gear wheel similar to gear wheel 205 as illustrated in FIGS. 2A–2C but made of a conducting material may be used to selectively interpose conductor 350 between capacitor plates 105. Significantly, the interposition of conductor 350 between capacitor plates 105 effectively shortens the distance between capacitor plates 105, resulting in a shift in capacitance. Conductor 350 may be made of aluminum or other conducting materials suitable for MEMS.

As illustrated in FIG. 3A, a capacitance $C_3$ of capacitor 101 when conductor 350 is not interposed between capacitor plates 105 may be generally described as:

$$C_3 = \epsilon * k * A / d, \tag{7}$$

where d is a distance between capacitor plates 105 and $\epsilon$ is a dielectric constant of air or vacuum separating capacitor plates 105. According to the alternate embodiment of the invention, a voltage $V_3$ is initially applied across capacitor 101 such that electric charges are built up on capacitor plates 105. Capacitor 101 is then electrically isolated such that the voltage $V_3$ is maintained across capacitor 101. The total charge, Q, stored in capacitor 101 may be calculated by:

$$Q = C_3 * V_3. \tag{8}$$

According to the alternate embodiment, conductor 350 is then interposed between capacitor plates 105, as illustrated in FIG. 3B, to form two capacitors in series. The equivalent capacitance, $C_4$, of the two capacitors may be calculated by the equation:

$$C_4 = \epsilon * k * A / (d_1 + d_2), \tag{9}$$

where $d_1$ and $d_2$ are distances between conductor 350 and a respective one of capacitor plates 105.

Since charge is conserved when capacitor 101 is electrically isolated, $$Q = C_3 * V_3 = C_4 * V_4,$$

or, $$V_4 = (C_3 / C_4) * V_3,$$

or, $$V_4 = [d / (d_1 + d_2)] * V_3. \tag{10}$$

Therefore, voltage across capacitor 101 is shifted when a conducting material is interposed between capacitor plates 105. Notably, the voltage gain is proportional to a ratio of $d/(d_1+d_2)$. Thus, by providing conductors having different thickness, a wide range of voltage levels can be achieved.

A electro-mechanical voltage shifter of the present invention has thus been disclosed. The present invention employs micro-mechanical elements that achieve voltage shifting by a combination of electrical and mechanical principles. Further, by selectively interchanging different dielectric medium or conducting medium between capacitor plates, a wide range of voltage levels may be provided to meet various requirements of electrical and mechanical devices in a micro-electromechanical system.

What is claimed is:

1. A micro-electromechanical voltage shifter comprising:
   a capacitor; and
   micro-electromechanical means for altering a capacitance of said capacitor, said micro-electromechanical means further including means for selectively interposing a first dielectric medium and a second dielectric medium between capacitor plates of said capacitor, wherein said capacitance varies according to said dielectric media interposed between said capacitor plates.

2. The micro-electromechanical voltage shifter according to claim 1 further comprising means for electrically charging said capacitor to said first voltage.

3. The micro-electromechanical voltage shifter according to claim 2 further comprising means for electrically isolating said capacitor when said capacitance is altered.

4. The micro-electromechanical voltage shifter according to claim 1 wherein a voltage gain of said micro-electromechanical voltage shifter is proportional to a ratio of dielectric constants of said dielectric media.

5. The micro-electromechanical voltage shifter according to claim 1 wherein said first dielectric medium and said second dielectric medium have a different thickness.

6. A micro-electromechanical voltage shifter compressing:
   a capacitor; and
   micro-electromechanical means for altering a capacitance of said capacitor, said micro-electromechanical means further including means for interposing a conductor between capacitor plates of said capacitor,
   wherein said capacitance is altered when said conductor is interposed between said capacitor plates.

7. The micro-electromechanical voltage shifter according to claim 6 wherein capacitance of said capacitor is altered according to a thickness of said conducting material and a separation distance between said capacitor plates.

8. A micro-electromechanical voltage shifter comprising:
   a gear wheel pivotable around an axis, the gear wheel having a first tooth protruding from said gear wheel; and
   a capacitor having a pair of plates, said plates defining a gap, said capacitor being positioned next to said gear wheel and perpendicular to said axis, wherein said first tooth is configured to enter and leave said gap as said gear wheel rotates, further wherein voltage across said capacitor is shifted when said first tooth enters and leaves said gap.

9. The micro-electromechanical voltage shifter according to claim 8 wherein said gear wheel is coupled to be driven by a micro-motor.

10. The micro-electromechanical voltage shifter according to claim 9 wherein said gear wheel is rotated in a stepwise fashion.

11. The micro-electromechanical voltage shifter according to claim 9 wherein said gear wheel is rotated in a continuous fashion.

12. The micro-electromechanical voltage shifter according to claim 8 wherein said tooth is made of a dielectric material.

13. The micro-electromechanical voltage shifter according to claim 8 wherein said capacitor has a first capacitance when said tooth is interposed between said plates, and wherein said capacitor has a second capacitance when said tooth is rotated out of said gap.

14. The micro-electromechanical voltage shifter according to claim 13 wherein s aid first capacitance is proportional to a dielectric constant of said tooth.

15. The micro-electromechanical voltage shifter according to claim 12 wherein said dielectric material comprises polysilicon.

16. The micro-electromechanical voltage shifter according to claim 12 wherein said dielectric material comprises silicon dioxide.

17. The micro-electromechanical voltage shifter according to claim 8 further comprising
   a second tooth protruding from said gear wheel, said second tooth having a different thickness from said first tooth, wherein a different voltage level is achieved when said second tooth is interposed between said gap.

18. The micro-electromechanical voltage shifter according to claim 8 wherein said tooth is made of a conducting material.

19. The micro-electromechanical voltage shifter according to claim 18 wherein capacitance of said capacitor is altered according to a thickness of said conducting material and a separation distance between said capacitor plates.

20. The micro-electromechanical voltage shifter according to claim 18 wherein said conducting material comprises aluminum.

21. A method for converting an initial voltage to a final voltage for application in a micro-electromechanical system, the method comprising the steps of:
   a) providing a capacitor having a first capacitor plate and a second capacitor plate;
   b) charging said capacitor to said initial voltage;
   c) electrically isolating said capacitor after step (b); and
   d) after step (c), altering a dielectric medium of said capacitor to change a capacitance of said capacitor and to convert said initial voltage to said final voltage.

22. The method according to claim 21 wherein step (d) further comprises the step of:
   replacing a first dielectric medium of said capacitor with a second dielectric medium, wherein said capacitance is changed according to a ratio of dielectric constants of said first and second dielectric media.

23. A method for converting an initial voltage to a final voltage for application in a micro-electromechanical system, the method comprising the steps of:
   a) providing a capacitor having a first capacitor plate and a second capacitor plate;
   b) charging said capacitor to said initial voltage:
   c) electrically isolating said capacitor after step (b); and
   d) after said step (c), interposing a conducting material between said capacitor plates to alter a capacitance of said capacitor according to a thickness of said conducting material and a separation distance between said capacitor plates, and to convert said initial voltage to said final voltage.

* * * * *